UNITED STATES PATENT OFFICE.

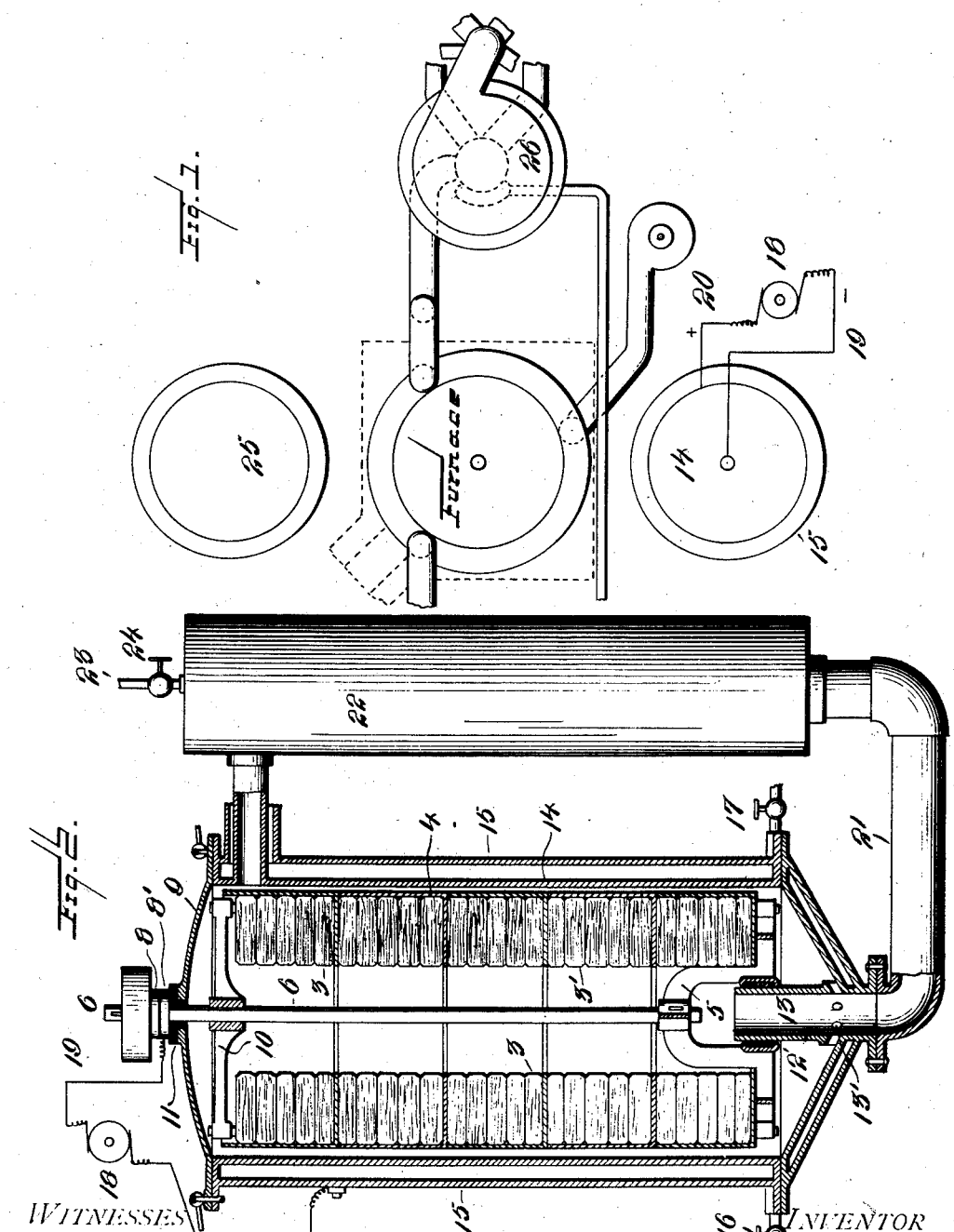

ELMER A. SPERRY, OF BROOKLYN, NEW YORK.

PROCESS OF PREPARING MERCHANTABLE IRON FROM TIN-PLATE SCRAP.

No. 901,266.  Specification of Letters Patent.  Patented Oct. 13, 1908.

Application filed March 13, 1908. Serial No. 420,946.

*To all whom it may concern:*

Be it known that I, ELMER A. SPERRY, a citizen of the United States, residing at Brooklyn, in the county of Kings and State of New York, have invented new and useful Improvements in Processes of Preparing Merchantable Iron from Tin-Plate Scrap, of which the following is a specification.

This invention has for its object the reclaiming of the values from tin-plate scrap and especially the preservation of the black scrap remaining after the tin has been removed and the preparation of such scrap for furnacing.

The further object of the invention is to preserve any inert bodies or residues associated with the tin, for instance, the resulting black scrap from attack by the reagent or reaction products present.

When reclaiming the values from tin scrap, as for instance by making the chlorin compounds of tin from scrap containing about $2\frac{1}{2}\%$ of tin, the heat generated is sufficient to raise the scrap as a whole, including the steel plate with specific heat of .1 to a very high temperature, unless the heat of the reaction is absorbed.

Whereas dry chlorin or moist chlorin in the presence of anhydrous stannic chlorid does not attack steel, yet owing to the zone where the tin and steel are alloyed, the complete removal of the tin, which can only be accomplished by chlorin so far as known, leaves this zone in a spongy state with a great many minute particles of iron resting upon the surface of the black scrap, which are usually converted into halogen compounds of iron. In every instance these compounds are hydroscopic, and in most instances to the point of deliquescence, the resulting solutions breaking up into the oxid of iron and the acid radical which attacks more iron; the oxid thus gradually increases until finally the whole body of the steel has been converted into the oxid.

Another object of the invention is to prevent this progressive action of the halogen iron compounds, and to do this certain hydrogen or cathodic treatment, or both of the black scrap are resorted to in a suitable electrolyte, preferably one containing an alkali, free or neutral. This treatment ionizes the acid radical which goes to the anode, leaves the steel and thus the black scrap is rendered non-rustable, and becomes a true "weathering" scrap.

Other details are described in the specification illustrated in drawings and pointed out in the claims forming a part hereof.

Referring now to the accompanying drawings which are employed simply as illustrating one method of carrying out my invention and in which the reference characters indicate similar parts throughout: Figure 1 is a diagrammatic view of the arrangement of that particular portion of the plant which relates to the present invention and Fig. 2 is a view of the treating chamber showing the bundled scrap in place therein,—the treating chamber is shown in vertical section.

The scrap is preferably compressed prior to detinning, the bundles being preferably laminated and indicated by 3 (Fig. 2). These are placed in circular rows in the revolving cylinder 4, which is preferably perforated, resting upon the spider 5, all of which is supported by the shaft 6 operated by pulley 7, resting on suitable ball-bearings 8 and guided by the rods 9 rising from the bottom spider 5 upwardly through the spider 10. The shaft is insulated above by insulating packing 11 and below by insulation 12, working on the exterior of tube 13 rising from the bottom of the cylinder 14 which may or may not be provided with the jacket indicated at 15. The connection with the jacket is secured through valves 16 and 17; additional connection is established with vertical pipe 13 by holes 13'. The lower portion of the ball-race indicated at 8', resting on the insulation 11, serves to establish connection with one pole of the generator 18 as indicated by conductor 19, the other pole being connected by conductor 20 to the cylinder 14. A continuation of pipe 13 is indicated at 21 which bends and rises up and connects to the bottom of tank 22, the upper portion of which may be served with a supply pipe 23, containing valve 24; the centrifugal force generated by the rotation of the scrap causes a flow or circulation of the fluids, the arrows indicating the direction of such flow in the circuit, viz: out at the top of the cylinder 14, downwardly through tank 22 and upwardly through the pipe 13, the centrifugal force through the interstices of the scrap securing a rapid circulation from the center outwardly in the direction indicated. The treating vessel wherein the tin is removed during the process of detinning may be similar to chamber 14 or any other form of reaction chamber may be employed.

Fig. 1 gives a diagrammatic view of the general arrangement of plant, showing the various connecting passages. At right angles to the furnace are two jacketed cylinders 14 and 25 respectively. In the upper one on the drawing, the billeted scrap after being mounted upon the shaft 6, is lowered, and treated in any suitable manner, for instance washing, to prepare it for the next step in order, which is raising to a high temperature in the furnace, whereupon and preferably while still heated, it goes into either one or the other of the treating vessels 26, where it may be still further treated by heated air by the proper manipulation of the valves while under conditions of rotation and corresponding centrifugal stress which being applied as it is, parallel to and in line with the laminæ 3′ of the bundles 3, tends to open same and thus open up the bundles of scrap for better penetration of the liquids or gases,—and, in fine, the special treatment to which the scrap is being subjected at the time; this centrifugal stress is preferably applied in the pretreating vessel 25 and also in the furnace so marked. In addition to this centrifugal stress, the scrap may be heated and cooled, which in and of itself tends to open up the interstices of compacted scrap to a remarkable degree. It has been found with the apparatus illustrated herein, with the baskets 4, 60″ in diameter, with a comparatively low rotative speed, pressures exceeding 100 pounds per square inch can be developed within the billets of scrap, and being unidirectional in its application and especially practically in line with the layers, opens up the interior of the masses to a remarkable degree for quick penetration of the reagent, menstrum or other active agent as stated. After the reaction is completed, the scrap is then heated to a high degree and may be then or afterward air-washed with heated air, all under conditions of centrifugal stress or change in centrifugal stress, for removing the last trace of both the reagent and the product. The remaining black scrap now goes to chamber 14 after the reaction and the separating treatment above described in the reaction vessel 26, and preferably while still in a heated state. Here it is washed free of any remnant of the reagent or products, and treated with a suitable non-rusting material, or compound, such for instance as caustic alkali, or a neutral bath from which alkali may be derived. When in this bath and in the presence of suitable electrolyte, such as the caustic, the scrap is insulated from the vessel itself, current passing through the shaft 6 and through the scrap in the electrolyte, constituting the scrap as the cathode element; the direction of the current being from generator 18 to vessel 14, thence to the scrap through the electrolyte, shaft 6, conductor 19, back to the generator. This ionizes any acid radical retained within the interstices of the scrap, and quickly dissipates and dispels same towards the anode; nascent hydrogen may also be and usually is liberated at the cathode by the current which it will be remembered penetrates the innermost interstices of the compacted scrap, and thus the scrap is freed from acid and the iron compounds are reduced to metallic iron and thereby rendered merchantable. From vessel 14 the group of retainers is dismembered. Each retainer is in turn lifted from its position around the shaft, and the billets removed from the retainers as by dumping, and the retainers refilled, and the process repeated.

It will be readily understood that the scrap treated by this process need not be billeted, but when so billeted it is possible to develop in a 60″ retainer a pressure of over 100 lbs. per square inch on the interior of the billets by a comparatively low rate of revolution of the retainer upon the shaft 64. This organization requires little power except for overcoming the inertia, inasmuch as the whole load is borne by the ball bearings 8 seen in Fig. 2 below pulley 7. It will further be noticed that the centrifugal stress thus developed is unilinear in direction and is at right angles to the line of the thickness of the billets and also at right angles to the line of pressure applied in the compacting of the billets, and furthermore in line with the laminations 3′ within the billets, whereby the interstices of the compacted scrap are opened up vigorously for the entrance of the reagent, removal of the product for the heating both before and after the reaction, for the drying off of the product and for the impregnation of the mass by the alkali and electrolytically developed action and also the hydrogen all for the protection of the black scrap.

Having pointed out the essential features of my process or method of treatment of tin scrap, I may state that the process should not in any way be limited to the exact details of the method or apparatus described herein with reference to any particular step or indeed the exact order of the steps, which are simply given as illustrating one method of carrying my process into effect.

It should be mentioned that this process may be varied in some of its parts to suit the special form of tin bearing material or the peculiarity of the reagent or electrolyte itself, thus the process should be suited to the changes in characteristics of both elements, and in this instance steps may be altered or omitted and others may be employed, and the invention extends to such use.

I claim—

1. The process of preparing merchantable iron from tin plate scrap which consists in treating the scrap with a suitable reagent for removing the tin and treating the resulting black scrap with hydrogen for removing the residuary reagent or reaction products therefrom.

2. The process of preparing merchantable iron from tin plate scrap which consists in treating the scrap with a suitable reagent for removing the tin, and treating the resulting black scrap with nascent hydrogen for removing the residuary reagent or reaction products therefrom.

3. The process of preparing merchantable iron from tin plate scrap which consists in treating the scrap with a suitable reagent for removing the tin, and treating the resulting black scrap with electric current in an electrolyte suitable for removing the residuary reagent or reaction products therefrom.

4. The process of preparing merchantable iron from tin plate scraps which consists in treating the scrap with a suitable reagent for removing the tin, and treating the resulting black scrap with an electric current coupled as cathode in an alkaline electrolyte.

5. The process of preparing merchantable iron from tin plate scrap which consists in treating the scrap with a suitable reagent for removing the tin, treating the resulting black scrap with an electric current in a suitable electrolyte, rinsing and drying.

6. The process of preparing merchantable iron from tin plate scrap which consists in treating the scrap with a suitable reagent for removing the tin, treating the resulting black scrap with an electric current, in a suitable electrolyte, rinsing and drying with application of heat.

7. The process of preparing merchantable iron from tin plate scrap which consists in treating the scrap with a suitable reagent for removing the tin, treating the resulting black scrap with electricity in an electrolyte suitable for removing the reagent and forcing the electrolyte into the interstices of the scrap by opening up the mass during electrolysis.

8. The process of preparing merchantable iron from tin plate scrap which consists in treating the scrap with a suitable reagent for removing the tin, treating the resulting black scrap with electricity in an electrolyte suitable for removing the reagent and forcing the electrolyte into the interstices of the scrap by opening up the mass by mechanical pressure during electrolysis.

9. The process of preparing merchantable iron from tin plate scrap which consists in treating the scrap with a suitable reagent for removing the tin, treating the resulting black scrap with electricity in an electrolyte suitable for removing the reagent and forcing the electrolyte into the interstices of the scrap by opening up the mass by centrifugal stress during electrolysis.

10. The process of preparing merchantable iron from tin plate scrap which consists in treating the scrap with a suitable reagent for removing the tin, treating the resulting black scrap with electricity in an electrolyte suitable for removing the reagent and forcing the electrolyte into the interstices of the scrap by opening up the mass by heat and pressure during electrolysis.

11. The process of preparing merchantable iron from tin plate scrap which consists in treating compacted scrap with a suitable reagent for removing the tin, washing the resulting black scrap and treating such scrap with hydrogen.

12. The process of preparing merchantable iron from tin plate scrap which consists in treating compacted, laminated scrap with a suitable reagent for removing the tin, treating the resulting black scrap with electricity in an electrolyte suitable for removing the reagent and forcing the electrolyte into the interstices of the scrap by opening up the mass by pressure applied transversely to the layers during electrolysis.

13. The process of preparing merchantable iron from tin plate scrap which consists in treating the scrap with a suitable reagent for removing the tin, treating the resulting black scrap with an electric current in an electrolyte suitable for removing the reagent or reaction products therefrom and controlling the temperature of the electrolyte.

14. The process of preparing merchantable iron from tin plate scrap which consists in treating the scrap with a suitable reagent for removing the tin and treating the resulting black scrap with an electric current in a hot electrolyte suitable for removing the reagent or reaction products therefrom.

15. The process of preparing merchantable iron from tin plate scrap which consists in treating the scrap with a suitable reagent for removing the tin, treating the resulting black scrap with heat and with an electric current, in an electrolyte suitable for removing the reagent or reaction products therefrom.

16. The process of preparing merchantable iron from tin plate scrap which consists in treating the scrap with a suitable reagent for removing the tin, treating the resulting black scrap with an electric current in an electrolyte suitable for removing the reagent or reaction products therefrom and varying the temperature of the electrolyte.

17. The process of preparing merchantable iron from tin plate scrap which consists in treating the scrap with a suitable reagent for removing the tin, treating the resulting black scrap with electricity in an electrolyte suitable for removing the reagent and forcing the electrolyte into the interstices of the scrap by pressure within the electrolyte during electrolysis.

18. The process of preparing merchantable iron from tin plate scrap which consists in treating the scrap with a suitable reagent for removing the tin, treating the resulting black scrap with an electric current in an electrolyte suitable for removing the reagent or reaction products therefrom, and moving the electrolyte during such treatment.

19. The process of preparing merchantable iron from tin plate scrap which consists in treating the scrap with a suitable reagent for removing the tin, treating the resulting black scrap with an electric current in an electrolyte suitable for removing the reagent or reaction products therefrom and agitating the electrolyte during such treatment.

20. The process of preparing merchantable iron from tin plate scrap which consists in suitably treating the scrap for removing the tin treating the resulting black scrap with an electric current in an electrolyte suitable for removing the reagent or reaction products therefrom and vigorously circulating the electrolyte during the treatment.

21. The process of preparing merchantable iron from tin plate scrap which consists in suitably treating the scrap for removing the tin, treating the resulting black scrap with an electric current in an electrolyte suitable for removing the reagent or reaction products therefrom and vigorously circulating the electrolyte in a circuit, a portion of which lies exterior to the electrolyzing chamber.

In testimony whereof I have hereunto set my hand in presence of two subscribing witnesses.

ELMER A. SPERRY.

Witnesses:
  A. MATTULLATH,
  FRANCIS O. PAUST.